United States Patent
Foster et al.

[15] 3,696,667
[45] Oct. 10, 1972

[54] TENSIONING DEVICE FOR POSITION MEASURING TRANSFORMER

[72] Inventors: Vincent F. Foster, New Rochelle; Robert A. Schreitz, Hartsdale, both of N.Y.

[73] Assignee: Inductosyn Corporation, New York, N.Y.

[22] Filed: April 22, 1970

[21] Appl. No.: 30,838

[52] U.S. Cl. .................................................73/143
[51] Int. Cl. ..............................................G01l 5/06
[58] Field of Search ....73/141 AB, 143, 145; 33/137, 33/138, 139

[56] References Cited

UNITED STATES PATENTS

| | | |
|---|---|---|
| 580,609 | 4/1897 | Buck ....................73/141 AB |
| 816,032 | 3/1906 | Oertel..........................73/143 |
| 1,014,839 | 1/1912 | Miller..........................33/138 |
| 2,434,138 | 1/1948 | Adams............73/141 AB UX |
| 3,403,552 | 10/1968 | Erisman........................73/143 |

FOREIGN PATENTS OR APPLICATIONS 616,406  1/1949  Great Britain.........73/141 AB

*Primary Examiner*—Charles A. Ruehl
*Attorney*—William E. Beatty

[57] ABSTRACT

Tensioning device and a tensioning device in combination with an elastic transformer member of a position measuring transformer where the tensioning device stores a record of desired length and renders an indication of when the elastic member is at that desired length. The elastic member is typically a tape scale of steel which insulatingly supports a planar transformer winding. To permit accurate transformer operation, the elastic member, and therefore the supported winding, is at a desired length, such as a calibrated length, which is established by tensioning both the elastic member and the tensioning device until the tensioning device indicates that the desired length has been reached. The tensioning device includes elastic means, such as a spring, which substantially exhibits a predetermined force when constrained to a predetermined length. The tensioning device also includes calibrated means, such as a calibrating nut on a threaded shaft attached to the spring with the spring and shaft extending through a sleeve, for indicating when the elastic means is constrained substantially to the predetermined length as measured between a reference position and a calibration position.

8 Claims, 11 Drawing Figures

PATENTED OCT 10 1972

VINCENT F. FOSTER
R. A. SCHREITZ
INVENTORS.

BY W.E. Beatty
David E. Lovejoy
ATTORNEYS

VINCENT F. FOSTER
R. A. SCHREITZ
INVENTORS.

W. E. Beatty
David E. Lovejoy
ATTORNEYS

VINCENT F. FOSTER
R. A. SCHREITZ
INVENTORS.

BY W.C. Beatty

David E. Lovejoy
ATTORNEYS

TENSIONING DEVICE FOR POSITION MEASURING TRANSFORMER

BACKGROUND OF THE INVENTION

The present invention relates to a tensioning device and more particularly to a tensioning device in combination with an elastic member, such as a tape scale, of a position measuring transformer. The elastic member is typically the fixed member of two relatively movable members where each member includes transformer windings which, when suitably energized, produce electrical signals indicative of the relative position of the two members. For accurate operations of the transformer, the elastic member is tensioned to a desired length by the tensioning device.

One prior art elastic member, in the form of a tape scale, is shown and described in the above-identified U.S. Pat. No. 3,522,568. In that invention, the tape scale is tensioned between fixed supports at each end of a machine. The tape scale, as one member of a positioned measuring transformer, includes a continuous winding formed by the series connection of a plurality of equally spaced, parallel active conductors usually extending transverse to the length of the tape scale. The accurate spacing of the active conductors is important to the accuracy with which the position measuring transformer indicates or measures position. In order to assure that the active conductors have a desired spacing, the tape scale is adjustably tensioned until a calibrated length is achieved.

The tensioning means employed in the above-identified U.S. Pat. No. 3,522,568 includes a threaded shaft having one of its ends attached to one end of the tape scale and having its other end secured with a tensioning nut to a spring loaded block which in turn is connected to a fixed support on the machine. The opposite end of the tape scale is also rigidly mounted to the machine so that when the tensioning nut is tightened on the threaded shaft, tension is applied to the tape scale.

Several methods of tensioning the tape scale to its desired length are suggested in the above-identified U.S. Pat. No. 3,522,568. One method employs a gauge block and dial indicator in conjunction with data read out from the position measuring transformer itself. In one implementation, a 10 inch test measurement is read out in a convention manner from the position measuring transformer and that test measurement is compared against a 10 inch standard measurement established by the gauge block and dial indicator. If the test measurement is in error, the tensioning nut is correspondingly altered to increase or decrease tension until the test measurement equals the standard measurement. Several trials may be necessary to complete the adjustment.

Another method of determining the desired length is to compare test measurements from a tape scale under test with standard measurements from a standard tape scale. The comparison is conveniently made using both scales as parts of position measuring transformers. When the standard and test measurements match, the tensioning force on the tape scale is measured with an accurate tension measuring instrument. Thereafter, the tape scale may be installed at its desired length by accurately retensioning the scale, again employing an accurate tension measuring instrument.

The problem with prior art tape scales is that, in order to install them at their desired length, each installation requires accurate instruments for measuring tension and/or length. Further, each installation undesirably requires the attention of a person skilled in making accurate measurements. The installation of prior art tape scales is, therefore, more expensive and time consuming than desired.

SUMMARY OF THE INVENTION

In accordance with the above background of the invention, the present invention is a tensioning device, and a tensioning device in combination with an elastic member of a position measuring transformer, where the tensioning device stores a record of force required for a desired length and renders an indication of when the elastic member is at its desired length. The elastic transformer member, typically supporting a planar, array-type transformer winding, permits accurate transformer operation when the elastic member is at its desired length. The desired length is established by tensioning the elastic member and the tensioning device until a predetermined force has been applied as evidenced by an indication from the tensioning device. The tensioning device typically includes elastic means, such as a spring, which substantially exhibits the predetermined force when constrained to a predetermined length. The tensioning device also typically includes calibrated means, such as a calibrating nut and sleeve, for indicating when the elastic means is constrained substantially to the predetermined length as measured between a reference position and a calibration position.

In one embodiment of the present invention, a spring is rigidly connected at one end to a tape scale (which is an elastic member including a transformer winding) and rigidly connected at the other end to a threaded shaft. A sleeve is positioned around the spring and rests against a stop, which defines a reference position, at the tape scale end of the spring. A calibrating nut is screwed onto the shaft toward the sleeve, the sleeve being long enough to extend beyond the spring over the shaft. When the tape scale, fixed at one scale end, is tensioned during calibration to its desired length, by a force applied at the opposite scale end via the shaft and spring, the calibrating nut is screwed down and locked within a clearance distance of the sleeve thereby defining and storing a calibration position. When the tape scale is thereafter relieved of tension, the clearance distance between the sleeve and the calibrating nut is removed by relaxation of the spring. Thereafter, when the tape scale and the connected tensioning device are installed, an indication, after tension has been applied, that the tape scale is at its desired length appears when the calibrating nut is again a clearance distance from the sleeve.

In other embodiments of the invention, the elastic means of the tensioning device includes a spring employed in compression for storing and rendering an indication of when the tape scale or other elastic member is at its desired length. Further, the calibrated means includes alternative apparatus for storing and indicating a predetermined length as defined between reference and calibration positions. For example, one alternative includes a bolt passing through a helical spring so as to compress one end of the spring against the head of the bolt thereby establishing a calibration position and with the bolt passing through a connector compressing the other end of the spring where the connector is rigidly attached to the tape scale. The bolt has a calibrating nut screwed down to within a clearance distance of the connector which defines a reference position.

In accordance with a feature of the present invention, the change of length exhibited by the tape scale from its untensioned to tensioned conditions is much smaller (of the order of one-fiftyth) than the change of length of the tensioning device from its untensioned to tensioned conditions. Accordingly, any error resulting from inaccurate positioning of the calibrating nut or in observing the clearance distance results only in a much smaller error in the length of the tape scale. In a typical example with change differences of 1 to 50, the tolerances for setting the calibrating nut and for observing the clearance distance are one-fiftyth as critical as the tolerances allowable for changes in tape scale length.

In accordance with further features of the present invention, the tensioning device and the connected tape scale are mountable, at a desired length, between fixed supports on machines where those supports are inaccurately spaced or where the spacing varies widely from machine to machine. For example, fixed supports may be separated by 8 or 10 feet or more with differences from a given nominal separation by as much as several inches or more. The present invention aids in mounting tape scales to their desired length independent of these variations in fixed support separation.

A still further feature of the present invention is that it avoids the need attendant prior art devices of having an accurate tension or length measuring instrument and a person skilled in making accurate measurements available for tape scale installation.

In addition to the above features of the present invention, the present invention exhibits a safety feature. More particularly, being spring mounted, the tape scale is not permanently disturbed from calibration by an accidental shock to the scale. Although a tape scale may be disturbed accidentally by an operator, the shock resulting therefrom is absorbed by the tensioning device. The tensioning device quickly returns the tape scale to its desired length after the disturbing force is removed.

Still further, the present invention protects the tape scale from minor misalignments. When the slider member of the position measuring transformer travels a path, the slider engages the tape scale with tape scale guides which force the tape scale to conform to the slider path. If the tape scale is mounted between fixed supports along a line which, although unintended, is skewed to the slider path, the tape scale is deformed to follow the slider path. The tensioning device, being elastic in nature and therefore free to turn small amounts in any deformation direction, prevents the tape scale from being damaged by the slider. Additionally, the tape scale deformation such as caused by a slider has a tendency to cause the transformer to read out a position somewhat short of the actual position. The deformation, however, causes increased tension between the tape scale and tensioning device thereby lengthening the tape scale. This lengthening of the tape scale is a corrective response which tends to compensate for the tendency of the transformer to read out a position short of its actual position.

The foregoing and other objects, features, and advantages of the invention will be apparent from the following more particular description of preferred embodiments of the invention, as illustrated in the accompanying drawings.

DETAILED DESCRIPTION

Figure 1:
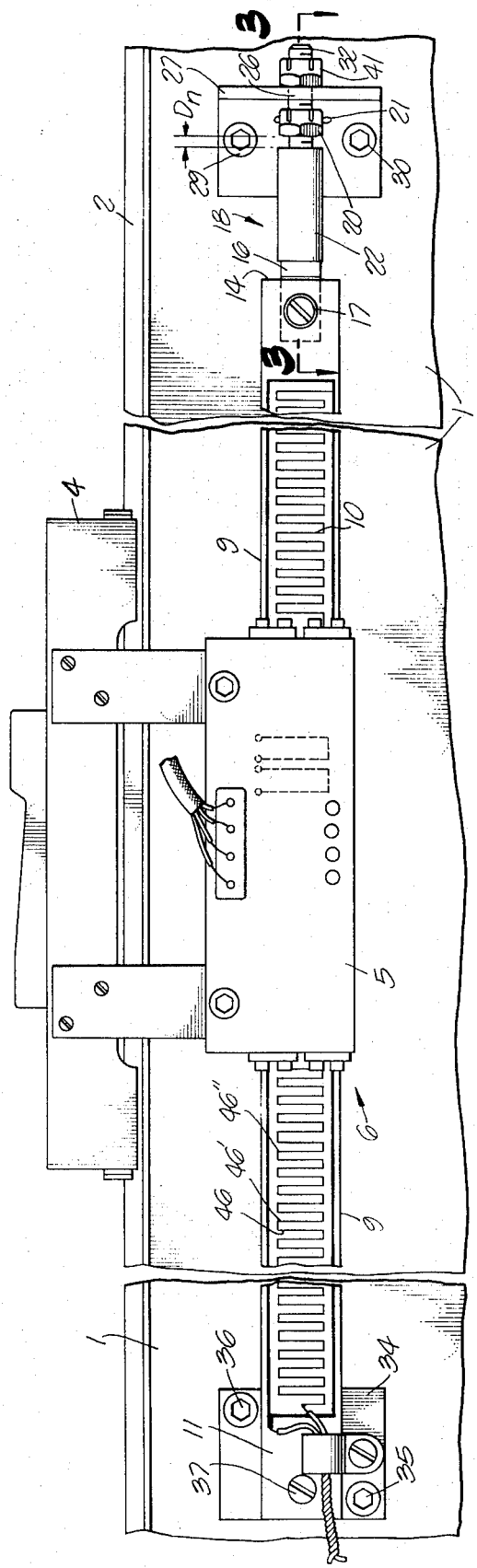
FIG. 1 depicts in accordance with the present invention a front view in elevation of a position measuring transformer having a tape scale tensioned by a tensioning device between the fixed supports of a machine.

FIG. 1 depicts a machine base 1 with a position measuring transformer 6 having relatively movable members in the form of a movable slider 5 and a tape scale 9. The position measuring transformer 6 is operative, in a well-known manner, to indicate the relative position of the slider 5 with respect to the tape scale 9 the latter fixed to the machine base 1. The slider 5 is rigidly attached to a machine carriage 4 which is movable along a machine way 2. The position measuring transformer 6 is, therefore, operative to indicate the relative position of machine carriage 4 with respect to the machine base 1.

The tape scale 9 is an elastic member which is tensioned between fixed supports on the machine base 1. At its first end 11, tape scale 9 is rigidly attached to machine base 1 by a fixed support in the form of a block bracket 34. Block bracket 34 is bolted to the machine base 1 by bolts 35 and 36. Tape scale 9 is attached to block bracket 34 by a bolt 37. At its opposite end 14, tape scale 9 is attached, by a tensioning device 18, to a fixed support in the form of an angle bracket 27. Angle bracket 27 is bolted to the machine base 1 by bolts 29 and 30.

Figure 2:
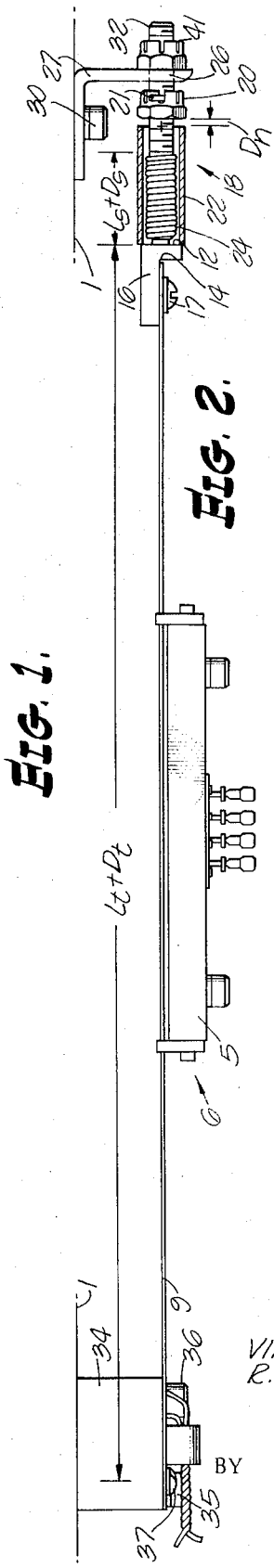
FIG. 2 depicts a top view of the tape scale and tensioning device of FIG. 1 with the sleeve portion of the tensioning device shown in cross section.
Figure 3:
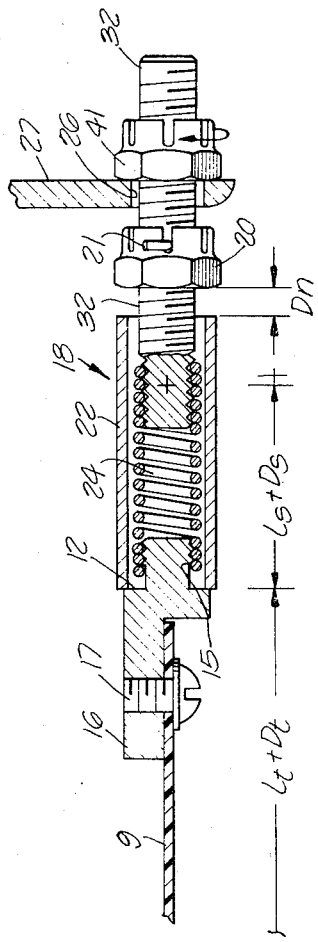
FIG. 3 depicts an enlarged sectional view on line 3—3 of FIG. 1.

As shown in FIGS. 1, 2, and 3 the tensioning device 18 is connected to the tape scale 9 by a bolt 17. Bolt 17 is secured to the connector 16 which is made of metal or other rigid material and which has a threaded end 15. The threaded end 15 is rigidly connected to a helical spring 24. The rigid connection is made, for example, by screwing the spring over the threaded end 15 so that the spring is frictionally attached thereto. The opposite end of the spring 24 from the tape scale 9 is also rigidly connected to a connector in the form of threaded shaft 32. Spring 24 typically grasps threaded shaft 32 in the same frictional manner that spring 24 attaches to threaded end 15. The pitch of the spring 24 is conveniently substantially the same as the pitch of threaded end 15 and threaded shaft 32.

While frictional connections of the spring onto the threads have been indicated, other fixed connections are, of course, possible. For example, a hole (not shown) may be drilled in the threaded shaft 32 and threaded end 15 and a bend (not shown) may be made in the spring wire at each end of the spring. The spring is then turned onto the threads in the same manner as with the frictional mount until the bent end of the wire reaches the hole. Thereafter, that bent end is forced into the hole thereby locking the spring.

Shaft 32 passes through a clearance hole 26 in angle bracket 27 and may be tensioned by tensioning nut 41 when that nut is screwed and tightened against angle bracket 27. When tensioning nut 41 is screwed onto the shaft 32, shaft 32 tensions the spring 24 which in turn tensions the tape scale 9. Since tape scale 9 is an elastic member, the tension applied by tensioning nut 41 via threaded shaft 32 and spring 24 tends to lengthen tape scale 9.

Tape scale 9 includes a continuous winding 10 which is formed by a plurality of active conductors such as typical active conductors 46, 46', and 46'', extending transversely of the length of the tape scale 9 and of the direction of movement of the slider 5. Since the spacing between the conductors, such as between typical active conductors 46 and 46', is critical for the accuracy of the position measuring transformer 6 and since the spacing between those active conductors is affected by the length of the tape scale 9, a proper tension must be applied by the tensioning device 18 in order to insure that the length of tape scale 9 is the length which accurately produces the desired active conductor spacing.

In FIG. 2, tape scale 9 is shown tensioned to its desired length, $Lt+Dt$, where $Lt$ is the untensioned length of the tape scale 9, and $Dt$ is the length added thereto by tension. When the tape scale 9 is at a length $Lt+Dt$, the tensioning device including spring 24 has a length $Ls+Ds$ where $Ls$ is the untensioned spring length and $Ds$ is the incremental distance added by tension when the tape scale 9 is at its desired length $Lt+Dt$.

For a typical tape scale, the tensioning force applied and stored in the tensioning device is nominally 20 pounds and the tape scale strain is typically 0.0004 inch per pound per 6 foot length. Also the strain of the spring is typically much greater, in the order of 50 times greater, than that of the tape scale, so that for a 20 pound force the tape scale typically increases in length by 0.0080 inch and the spring length typically changes 0.400 inch. The clearance distance, $Dn$, is typically 0.005 inch. For the typical values given, the clearance distance 0.005 inch is 1¼ percent of the spring length change of 0.400 inch. A 0.005 inch travel is conveniently provided by one-sixth turn of a one thirty-second screw. The effect of variations in the nominal 0.005 inch clearance distance on the tape scale length is reduced by the 50 to 1 length change ratio between spring and tape scale. For example, when the tape scale and tensioning device are first tensioned to a point where the clearance distance just exceeds 0, the tape scale will have an initial length. Thereafter, when tension is increased so that the clearance distance is 0.005 inch, the tape scale will have a final length. For the typical values given, the difference in length of the tape scale from the initial to the final length is of the order of 0.0001 inch, which is also 1¼ percent of the change in length (0.0080 inch).

The method of initially setting the tape scale 9 to its desired length is typically like that employed in the prior art as described above under the heading Background of the Invention.

The adjustment of tension for tape scale 9 is achieved by adjusting the position of tensioning nut 41 on threaded shaft 32 so that tensioning nut 41 is tightened against or loosened from angle bracket 27. When the desired length is achieved, such as measured by a dial indicator and gauge block, the calibrating nut 20 is screwed down on shaft 32 within a clearance distance $Dn$ of one end of sleeve 22 when the other end of sleeve 22 is in contact with and stopped against the shoulder 12 of connector 16. Shoulder 12 therefore establishes a reference position and calibrating nut 20 establishes a calibration position.

OPERATION

FIGS. 4a through 4depict schematic representations of various lengths and tensions for elastic members and tensioning devices like those depicted in FIGS. 1, 2 and 3. The numbering in FIGS. 4a through 4e corresponds to the numbering in FIGS. 1, 2 and 3 with an addition of primes. For example, in FIG. 4a tape scale 9' connected to tensioning device 18' corresponds to tape scale 9 and tensioning device 18 in FIG. 1, respectively.

Figure 4A:
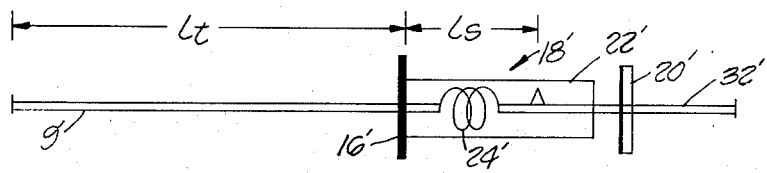
FIGS. 4a through 4e depict schematic representations of a tape scale and tensioning device under various conditions of tension and length.

In FIG. 4a, the tape scale 9' and the tensioning device 18' are shown in a completely relaxed position, such as when they are not connected between fixed supports. In that relaxed position, the tape scale 9' has a length $Lt$, and the spring 24' within the tensioning device 18' has a length, $Ls$. In this initial untensioned condition the calibrating nut 20' is at a distance from the sleeve 22'.

Figure 4B:
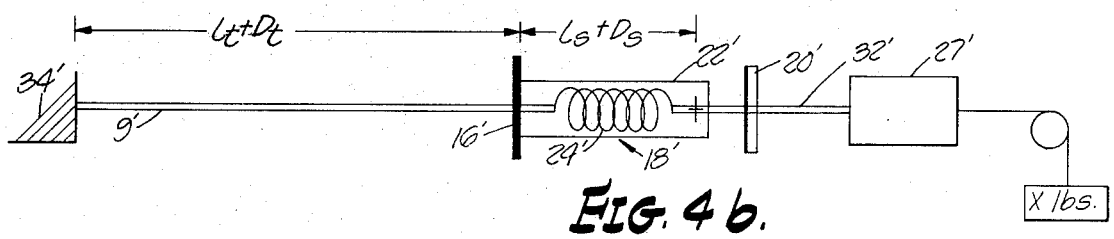

In FIG. 4b, the tape scale 9' and the tensioning device 18' are shown tensioned between supports 34' and 27'. A tensioning force is applied to the tape scale 9' and tensioning device 18'. The tape scale 9' is then tested in any well-known manner, such as by either of the methods described above under Background of the Invention, until the desired length $Lt+Dt$ is obtained for tape scale 9' with a tensioning force of X pounds. That desired length for tape scale 9' results in spring 24' being extended an amount $Ds$ so as to be constrained to a length $Ls+Ds$. After tensioning as shown in FIG. 4b, the calibrating nut 20' is a further distance from sleeve 22' than it was in the untensioned condition of FIG. 4a.

Figure 4C:
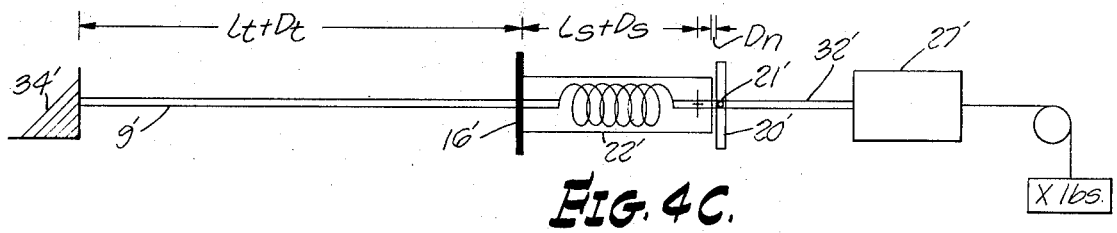

In FIG. 4c, the predetermined force of X pounds which tensions tape scale 9' to its desired length, $Lt+Dt$, is maintained and calibrating nut 20' is screwed down to within a clearance distance, $Dn$, of the sleeve 22'. Calibrating nut 20' is then locked in its position by a pin 21'.

Figure 4D:
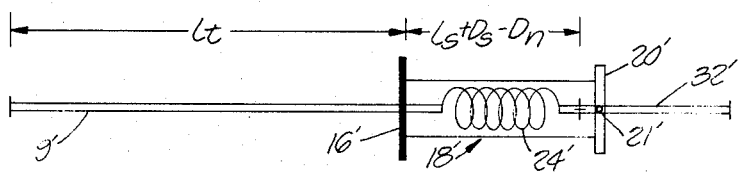

In FIG. 4d, the tape scale 9' and the connected tensioning device 18' are removed from the supports 34' and 27' such as occurs, for example, when the elastic member and tensioning device are shipped to a remote location for installation on a machine. Note that in FIG. 4d, the tape scale 9' has relaxed to its untensioned length of $Lt$ while the spring 24' has only relaxed to a length of $Ls+Ds-Dn$ because sleeve 22' prevents further relaxation. The clearance distance, $Dn$, between the calibrating nut 20' and the sleeve 22' as it existed in FIG. 4c is not present in FIG. 4d.

Figure 4E:
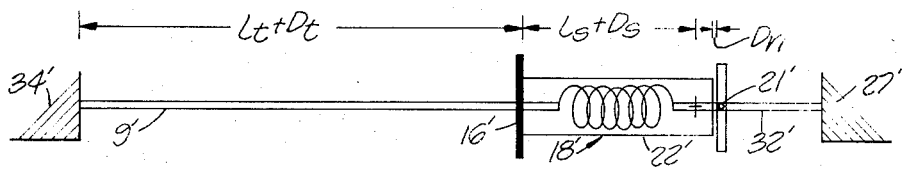

In FIG. 4e, the tape scale 9' and the tensioning device 18' are again tensioned between fixed supports 34' and 27'. Tension is applied until a clearance distance, $Dn$, again appears between the sleeve 22' and the calibrating nut 20', rendering tape scale 9' at its desired length $Lt+Dt$.

Although some differences in the clearance distance $Dn$ may result from FIG. 4c to FIG. 4e because no accurate measuring instruments are intended to be employed in setting the tape scale 9' to its desired length, these differences are minor to nature. In order to minimize the effects of these differences, the change $Ds$, of the spring under tension is much greater than the expansion, $Dt$, of the tape scale under tension. As an example, $Ds$ is typically 50 times greater than $Dt$. Therefore, any variance in the clearance distance $Dn$ is reduced in significance by a factor of 50. Of course, even greater differences in the order of 100 or 1,000 to 1 may be achieved by proper selection of springs 24' and tape scales 9'.

FURTHER AND OTHER EMBODIMENTS

Figure 5:
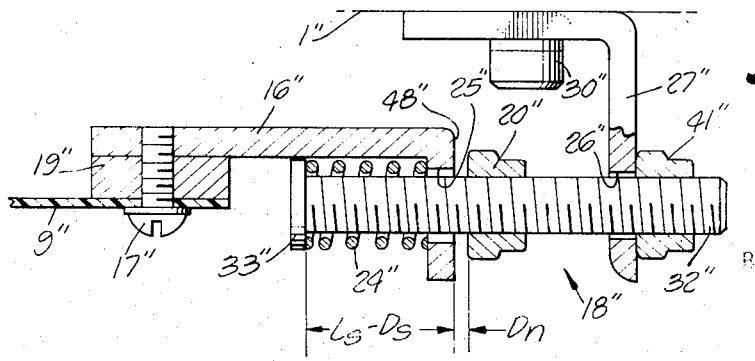
FIG. 5 depicts an alternate embodiment of the present invention.

FIG. 5 depicts an alternate embodiment of a tape scale 9" connected to a tensioning device 18". The tape tensioning device 18" includes an elastic means in the form of a compression spring 24" and a calibrated means in the form of a calibrating nut 20" screwed onto shaft 32" at a clearance distance, $Dn$, from a connector 16". The connector 16" is rigidly attached to the tape scale 9" by a bolt 17" separated by a spacer 19". The threaded shaft 32", passing through clearance hole 25" in the connector 16" and clearance hole 26" in fixed support 27" is tensioned by tensioning nut 41" threaded on shaft 32" against the fixed support 27". As tensioning nut 41" is screwed against fixed support 27", compression spring 24" is compressed while tape scale 9" is simultaneously tensioned. When tape scale 9" is tensioned to its desired length, calibrating nut 20" is screwed down to within a clearance distance, $Dn$, of the face 48" of connector 16". Suitable locking means, not shown, may be employed with calibrating nut 20" to assure that it does not move from its calibrated position. Such a locking means may be a pin (not shown) through the threaded shaft 32" such as described in connection with locking pin 21 of FIG. 1. Alternatively, set screws and many similar variations are possible.

If after setting the calibrating nut 20" to a clearance distance, $Dn$, the tensioning nut 41" is removed, relaxation of the compression spring 24" removes the clearance distance, $Dn$, in a similar manner to that previously described in connection with the FIG. 1 embodiment. Thereafter, installation of the tape scale 9" and the tensioning device 18" will recapture the tape scale 9" to its desired length when there is again the clearance distance, Dn, between the calibrating nut 20" and the bracket face 48".

In FIG. 5, the head 33" of bolt 32" defines a calibration position and the face 48" of connector 16" provides a reference position. The length of the spring 24" including the connector 16" thickness before compression is $Ls$ and that length is shortened under compression by an amount $Ds$ when the tape scale 9" is at its desired length.

Figure 6:
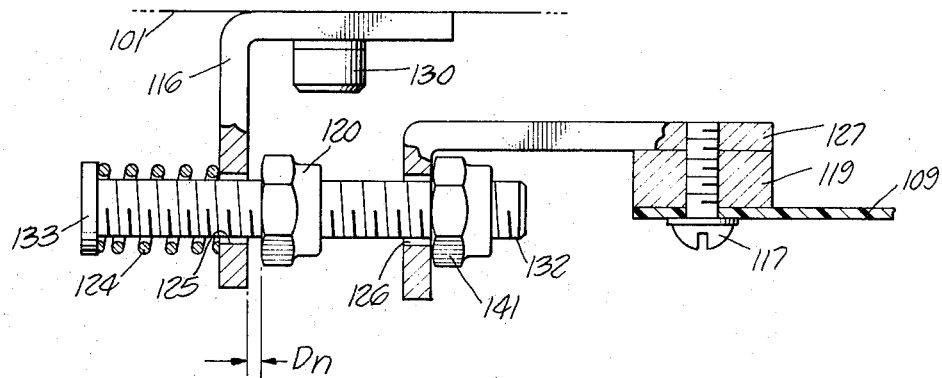
FIG. 6 depicts the embodiment of FIG. 5 with the tape scale and fixed supports reversed.

While the embodiments of the present invention have been described with the tensioning device connected at one end to the tape scale and connected at the other end to a fixed support on a machine, these tensioning device connections may be reversed. For example, in FIG. 6, showing a reversal of FIG. 5, the connector 116 is rigidly attached to the machine base 101 and the tape scale 109 is attached to the angle bracket 127.

The bolt head 133, bolt 132, spring 124, clearance hole 125, calibrating nut 120, clearance hole 126, tensioning nut 141, spacer 119, and bolt 117 correspond in function and design to the double prime numbered elements of FIG. 5 less the prefix 1. For example, bolt head 133 of FIG. 6 corresponds to bolt head 33" of FIG. 5.

Figure 7:
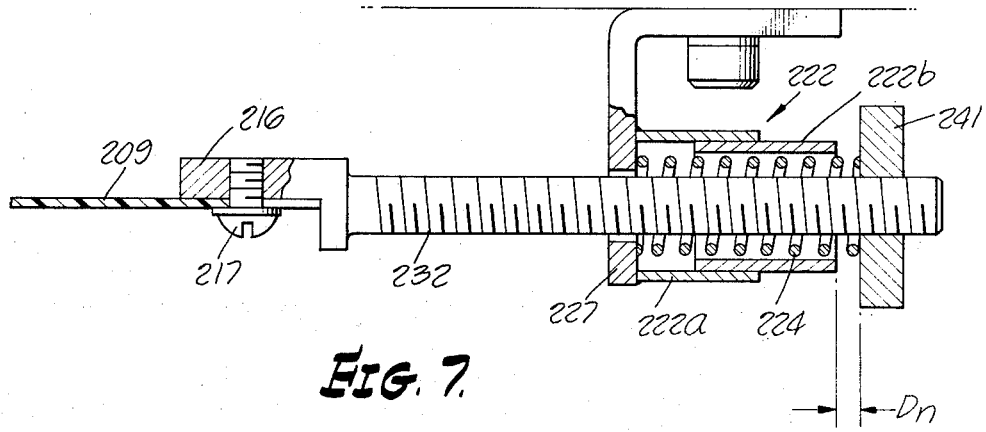
FIG. 7 depicts another alternate embodiment of the present invention.

In accordance with another embodiment of the present invention, and with reference to FIG. 7, a compression spring 224 is positioned around threaded shaft 232 having a connector end 216 rigidly attached to tape scale 209. The compression spring 224 is located between the tensioning nut 241 and the fixed support 227 so that the compression spring is compressed between nut 241 and angle bracket 227. Additionally, an adjustable sleeve 222 is positioned over the compression spring so that, when the spring 224 is uncompressed, the spring extends out beyond the length of the sleeve 222. When nut 241 is tightened down against the compression spring 224, tension is applied to the tape scale 209 connected to connector end 216 by bolt 217. When tape scale 209 is at its desired length, the adjustable sleeve 222 between nut 241 and angle bracket 227 is adjusted within a clearance distance of a length equalling the distance between angle bracket 227 and the nut 241. Sleeve 222 typically includes an outer wall 222 $a$ screwably or slideably movable over an inner wall 222 $b$. A set screw (not shown) or other means is typically employed to lock sleeve 222 at its desired length. Thereafter, when nut 241 is loosened thereby relaxing the tap scale 209 and the compression spring 224, tape scale 209 can be retensioned to its desired length by again screwing tensioning nut 241 down until it is within a clearance distance of the adjustable sleeve 222.

While the invention has been particularly shown and described with reference to preferred embodiments thereof, it will be understood by those skilled in the art that various changes in form and details may be made therein without departing from the spirit and the scope of the invention.

What is claimed is:

1. An apparatus for use in a position-measuring transformer comprising,
    an elastic member exhibiting a desired length under a predetermined force, and
    tensioning means connected to said member including,
        elastic means for applying said predetermined force to said elastic member when said elastic means is constrained to a predetermined length,
        first means fixed with respect to one end of said elastic means for defining a first position, second means fixed with respect to the other end of said elastic means for defining a second position, third means having a surface spaced relative to one of said first and second positions a distance which has a fixed dimension relative to said predetermined length thereby storing said predetermined length, fourth means for constraining said elastic member so that said surface is substantially positioned at the other one of said first and second positions whereby said elastic means is substantially constrained to said predetermined length.

2. The apparatus of claim 1 wherein said first means includes a connector rigidly attaching said one end of said elastic means to said elastic member, and wherein said second means includes a calibrating nut locked with respect to said other end of said elastic means, wherein said third means includes a sleeve encircling said elastic means between said connector and said calibrating nut, and wherein said fourth means includes a threaded shaft and tensioning nut, said shaft connected to said other end of said elastic means and supporting said calibrating nut.

3. The apparatus according to claim 1 wherein said first means includes a bracket for compressing said one end of said elastic means, wherein said second means includes a nut for compressing said other end of said elastic means, wherein said third means includes a sleeve encircling said spring and extending between said bracket and said calibrating nut, and wherein said fourth means includes a threaded shaft supporting said calibrating nut and connected to said elastic member through said elastic means, said bracket and said sleeve.

4. The apparatus of claim 1 wherein said elastic member is a tape scale of a position-measuring transformer and wherein said elastic means includes a tension spring.

5. The apparatus of claim 1 wherein said elastic member is a tape scale of a position-measuring transformer and wherein said elastic means includes a compression spring.

6. An apparatus for mounting an elastic member to a fixture comprising, elastic means flexibly connecting one end of said elastic member to said fixture, said elastic means having opposite ends, and wherein said elastic means changes in length under stress in the order of 50 times the corresponding change in length of said elastic member, means for defining a reference position with respect to one end of said elastic means, means for defining a calibration position with respect to the other end of said elastic means, and means for adjusting said other end of said elastic means to a calibrated position wherein the stress in said elastic means produces a desired elongation of said elastic member, said elastic means having a greater elasticity than said elastic member for reducing error in the length of said elastic member resulting from inaccurate positioning by said means for adjusting.

7. An apparatus for use in a position-measuring transformer comprising, a member exhibiting a desired length under a predetermined force, and tensioning means connected to said member comprising, elastic means, including a spring connected in compression, for applying said predetermined force to said member when said elastic means is constrained to a predetermined length, and calibrated means for indicating when said elastic means is constrained to substantially said predetermined length, said calibrated means including a threaded shaft for compressing said spring at one end, an angle bracket compressing said spring at its other end, and rigidly connected to said member, and a calibrating nut screwable on said shaft and lockable within a clearance distance of said angle bracket to indicate when said spring is at said second predetermined length.

8. The apparatus of claim 7 wherein said spring contracts in length under compression in the order of 50 times the expansion of said member.

* * * * *